United States Patent
Landry et al.

(10) Patent No.: US 7,516,340 B2
(45) Date of Patent: Apr. 7, 2009

(54) POWERED DEVICE INCLUDING A CLASSIFICATION SIGNATURE RESISTOR

(75) Inventors: D. Matthew Landry, Austin, TX (US); Russell J. Apfel, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 504 days.

(21) Appl. No.: 11/479,956

(22) Filed: Jun. 30, 2006

(65) Prior Publication Data

US 2008/0005598 A1    Jan. 3, 2008

(51) Int. Cl.
*G06F 1/00*    (2006.01)
(52) U.S. Cl. .................. 713/300; 713/310; 713/320; 713/321; 713/322; 713/323; 713/324; 713/330; 713/340; 323/316
(58) Field of Classification Search .................. 713/300, 713/310, 320–324, 330, 340; 323/316
See application file for complete search history.

(56) References Cited

U.S. PATENT DOCUMENTS

| | | | |
|---|---|---|---|
| 7,046,983 B2* | 5/2006 | Elkayam et al. | 455/402 |
| 7,187,268 B1* | 3/2007 | Armstrong et al. | 340/310.11 |
| 7,203,849 B2* | 4/2007 | Dove | 713/300 |
| 2006/0181817 A1* | 8/2006 | Ohana et al. | 361/18 |
| 2008/0040625 A1* | 2/2008 | Vorenkamp et al. | 713/340 |
| 2008/0077811 A1* | 3/2008 | Dove | 713/300 |
| 2008/0146146 A1* | 6/2008 | Binder et al. | 455/20 |

\* cited by examiner

*Primary Examiner*—Abdelmoniem Elamin
(74) *Attorney, Agent, or Firm*—Westman, Champlin & Kelly, P.A.; R. Michael Reed

(57) ABSTRACT

A method is provided that includes receiving a classification voltage at a powered device from a powered network and providing a classification signature to the powered network in response to receiving the classification voltage to specify a power requirement of the powered device. The method further includes deriving a reference current within the powered device and adjusting a current limit as a function of the reference current.

20 Claims, 5 Drawing Sheets

POWERED DEVICE INCLUDING A CLASSIFICATION SIGNATURE RESISTOR

FIELD OF THE DISCLOSURE

The present disclosure is generally related to powered devices in Power over Ethernet networks, and more particularly to powered devices including a classification signature.

BACKGROUND

Power over Ethernet (PoE), which is outlined in IEEE Std 802.3™-2005 clause 33 (the PoE standard), refers to a technique for delivering power and data to an electronic device via Ethernet cabling. In a PoE system, power sourcing equipment (PSE) provides a power supply to electronic devices, which may be referred to as powered devices, via an Ethernet cable. PoE eliminates the need for a separate power source to deliver power to attached powered devices. Such powered devices may include voice over Internet protocol (VoIP) telephones, wireless routers, security devices, field devices to monitor process control parameters, data processors, and the like.

The PoE standard specifies that a PSE perform a powered device detection operation to determine whether the powered device is attached before supplying power via the Ethernet cable. To perform detection, the PSE provides a DC voltage (within a range of 2.8 to 10 Volts DC) on pairs of wires of the Ethernet cable and monitors a received current (Amps) or a received voltage (V) to detect a resistance within an expected range (e.g. between 19 and 26.5 K-ohms). The PSE determines the powered device's presence using a Volt-Amp (VA) slope related to the powered device's voltage/current signature. If the PSE does not detect a valid resistance, the PSE does not apply power to the Ethernet port assigned to the powered device.

Once a powered device has been detected, the PoE standard specifies that the PSE may optionally perform a power classification operation to determine power requirements of the detected powered device. The PoE standard specifies five device classes, classes 0-4, which define expected power consumption levels of powered devices. If the PSE supports power classification, the PSE applies a classification voltage (DC) to the Ethernet port associated with the detected powered device. Assuming that the powered device supports classification, the powered device applies a resistive load to attenuate the DC voltage, current, or any combination thereof, to produce a current signature for the device. The PSE determines the powered device's power classification based on this current signature.

For example, a powered device may draw a current to specify its classification. A current draw of zero to four mA corresponds to class 0, which is also the default class for devices that do not support classification. A current draw of 26 to 30 mA and of 36 to 44 mA corresponds to class 3 and class 4 devices, respectively. The PoE standard specifies that the PSE provide a power supply of approximately 15.4 watts to devices of class 0, class 3 and class 4. A current draw of between 9 and 12 mA corresponds to a class 1 device, and the PoE standard specifies that the PSE provide a power supply of up to approximately 4 watts to a class 1 device. A class 2 device corresponds to a current draw of 17 to 20 mA and requires the PSE to provide approximately 7 watts of power.

The PSE may use the powered device power classification to manage power allocation with respect to an overall power budget of the PSE. If a power level associated with the power classification of the powered device exceeds the available budget, the PSE need not apply power to the associated Ethernet port. If the power desired is within the power budget, the PSE may apply power to the associated Ethernet port. By utilizing power classification, a PSE may more accurately determine an associated power demand and may be able to support a larger number of powered devices than if the PSE reserved a maximum power consumption for each powered device.

In a strict interpretation of the PoE standard, a powered device that specifies a power classification that is less than the maximum should also limit its current consumption to be consistent with its classification. However, conventional powered devices set only a single current limit that is appropriate for its maximum powering mode. Therefore, there is a need for enhanced management of powered electronic devices.

SUMMARY

In a particular embodiment, a method is provided that includes receiving a classification voltage at a powered device from a powered network and providing a classification signature to the powered network in response to receiving the classification voltage to specify a power requirement of the powered device. The method further includes deriving a reference current within the powered device from the classification signature and adjusting a current limit as a function of the reference current.

In another particular embodiment, a powered device includes an interface responsive to a powered network, a power over Ethernet (PoE) detection and classification circuit, a reference current generator, and a current limiter. The PoE detection and classification circuit detects a device classification voltage from the interface and provides a classification signature in response to the classification voltage. The reference current generator is responsive to the classification signature to generate a reference current. The current limiter circuit is responsive to the reference current to adjust a device current limit.

In yet another particular embodiment, a powered device includes a device classification pin, a classification circuit, a reference current generator, and a current limiter circuit. The device classification pin is responsive to an external resistance. The classification circuit applies a reference voltage to the device classification to produce a power over Ethernet (PoE) classification signature. The reference current generator derives a reference current from the PoE classification signature. The current limiter circuit limits a device current to a threshold defined by the reference current.

DETAILED DESCRIPTION OF THE DRAWINGS

Figure 1:
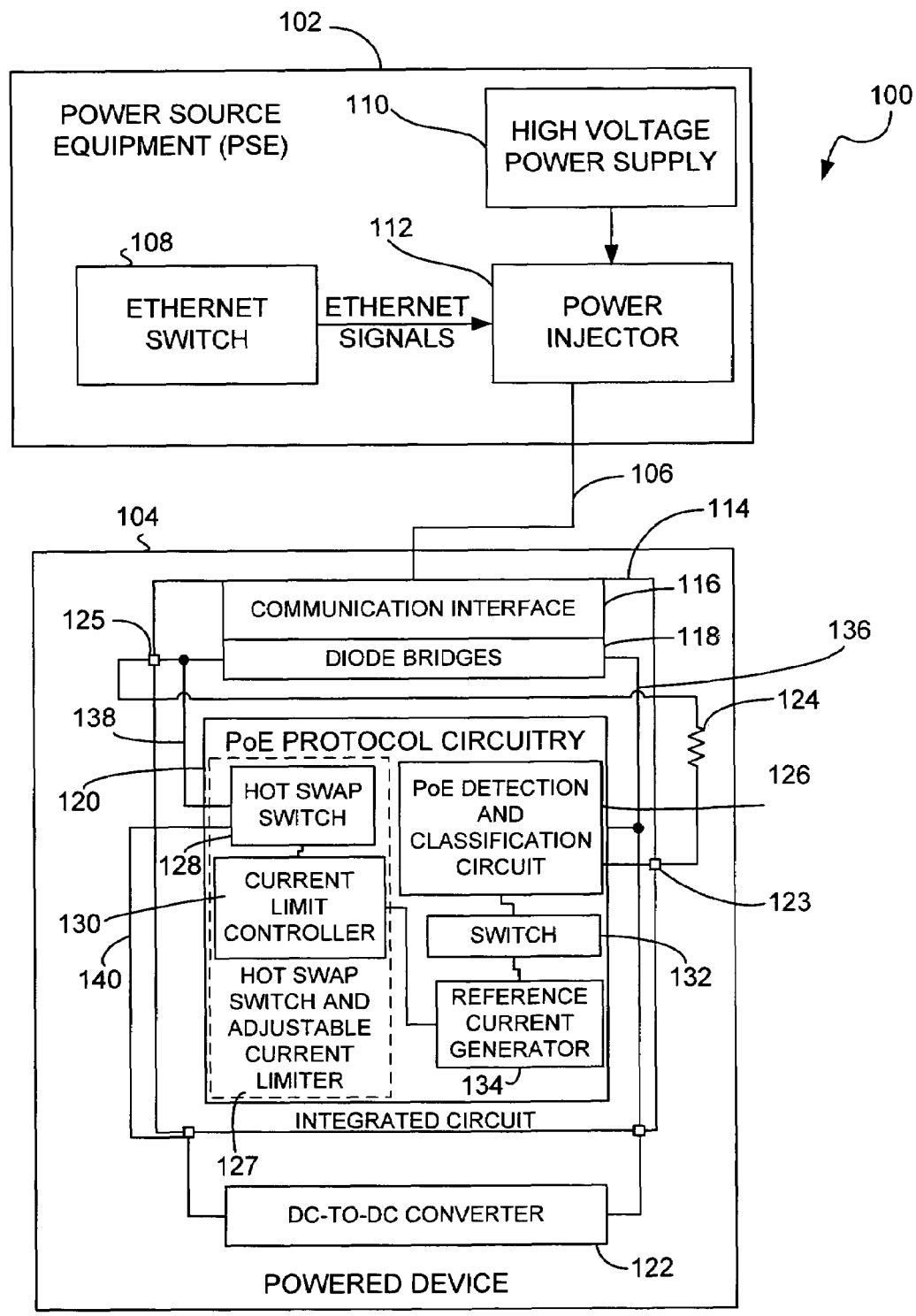
FIG. 1 is a block diagram of a particular embodiment of a Power over Ethernet (PoE) system including a powered device with an adjustable current limiter.

FIG. 1 is a block diagram of a particular embodiment of a Power over Ethernet (PoE) system 100 including a powered device with an adjustable current limiter. The system 100 includes power sourcing equipment (PSE) 102 and a powered device 104 communicatively coupled by a network cable 106, such as a twisted pair CAT5e Ethernet cable. The PSE 102 may include an Ethernet switch 108, a high voltage power supply 110, and a power injector 112.

The powered device 104 may include an integrated circuit 114, a DC-to-DC converter 122, and an external resistor 124. The integrated circuit 114 may include a communication interface 116, diode bridges 118, power over Ethernet (PoE) protocol circuitry 120, pins 123 and 125, and voltage supply terminals 136, 138 and 140. The PoE protocol circuitry 120 may include a PoE detection and classification circuit 126, a hot swap switch and adjustable current limiter circuit 127, a switch 132, and a reference current generator 134. The hot swap switch and adjustable current limiter circuit 127 may include a hot swap switch 128 and a current limit controller 130.

In general, though only a single powered device 104 is shown, it should be understood that the PSE 102 may be coupled to multiple powered devices and may provide power and data to each of the multiple powered devices. The PSE 102 includes a plurality of nodes, and each node of the plurality of nodes may be coupled to a powered device by a network cable. Additionally, it should be understood that each of the powered devices that are coupled to the PSE 102 may have different power requirements.

In operation, the PSE 102 performs a detection process to detect a powered device 104 attached to the network cable 106 and associated with a node of the Power Injector 112. In response to the detection process, the powered device 104 applies a resistance within a predetermined range (e.g. approximately 25K-ohms for the PoE standard), which provides an expected response for the PSE 102 to detect the presence of the powered device 104. Typically, the resistance is applied using an external resistor, such as the external resistor 124, in part, because it is difficult to fabricate an integrated resistor that provides the desired level of precision.

Once the PSE 102 detects the powered device 104, the PSE 102 may perform a classification process to determine the power requirements of the powered device 104 by applying a classification voltage to the node, which transfers the classification voltage to the powered device 104 via the network cable 106. The classification voltage may be less than an operating voltage of the powered device 104. The powered device 104 utilizes the PoE detection and classification circuit 126 to respond to the classification voltage by applying a known voltage to the external resistor 124 to produce a desired current (or classification signature) according to a particular Power over Ethernet classification, such as class 0, class 1, class 2, or class 3. Table 1 below provides an illustrative example of a set of power over Ethernet (PoE) power classifications.

TABLE 1

PoE Power Classifications.

| Class | Classification Current (mA) | Power level low (watts) | Peak Operating Current (mA) |
|---|---|---|---|
| 0 | 0 to 4 | 15.4 | 400 |
| 1 | 9 to 12 | 3.84 | 120 |
| 2 | 17 to 20 | 6.49 | 210 |
| 3 | 26 to 30 | 15.4 | 400 |
| 4 | 36 to 44 | 15.4 | 400 |

Once the PoE detection and classification circuit 126 provides the appropriate current to specify power requirements of the powered device 104, the switch 132 couples the reference current generator 134 to the PoE detection and classification circuit 126, enabling the reference current generator 134 to derive a reference current from the classification signature. The reference current generator 134 provides the derived reference current to the hot swap switch and adjustable current limiter circuit 127. In particular, the derived reference current is provided to the current limit controller 130, which uses the reference current to limit the flow of a port current (or device current) through the hot swap switch 128 from the voltage supply terminal 140 to the voltage supply terminal 138 and to the negative voltage port 125 coupled to the diode bridges 118.

In general, the communication interface 116 is responsive to a powered network, via network cable 106. The power over Ethernet (PoE) detection and classification circuit 126 detects a device classification voltage from the communication interface 116 and provides the classification signature in response to the classification voltage. The reference current generator 134 is responsive to the classification signature to generate a reference current related to the classification signature, and a current limiter circuit 127 is responsive to the reference current to adjust a device current limit. The hot swap switch 128 may selectively couple the voltage supply terminal 138 to the switched supply terminal 140 to conduct a port current (or device current). The hot swap switch 128 is responsive to the current limiter circuit 130 to adjust the device current to a level that is below the device current limit that is specified by the PoE power classification of the powered device. The reference current generator 134 may include a current mirror (shown as current mirror 316 in FIG. 3) to mirror the classification current to produce the reference current. In a particular illustrative embodiment, the external resistor 124 may define the classification signature that determines the power classification of the powered device. The device current limit may be dependent on the power classification.

By deriving the reference current from the classification signature and by limiting the device current as a function of the reference current, the device current is limited as a function of the classification signature presented by the PoE detection and classification circuit 126. Thus, the powered device 104 may be considered to be classification dependent. Moreover, instead of requiring a particular integrated circuit configured for a particular level of current consumption (e.g. for each possible PoE classification), the PoE protocol circuitry 120 may be adapted to limit current by simply adjusting a resistance of the external resistor 124 (such as by replacing the external resistor 124 with a resistor having a different resistance value) to present a different classification signature, resulting in a different reference current and an adjusted current limit related to the classification signature.

Figure 2:
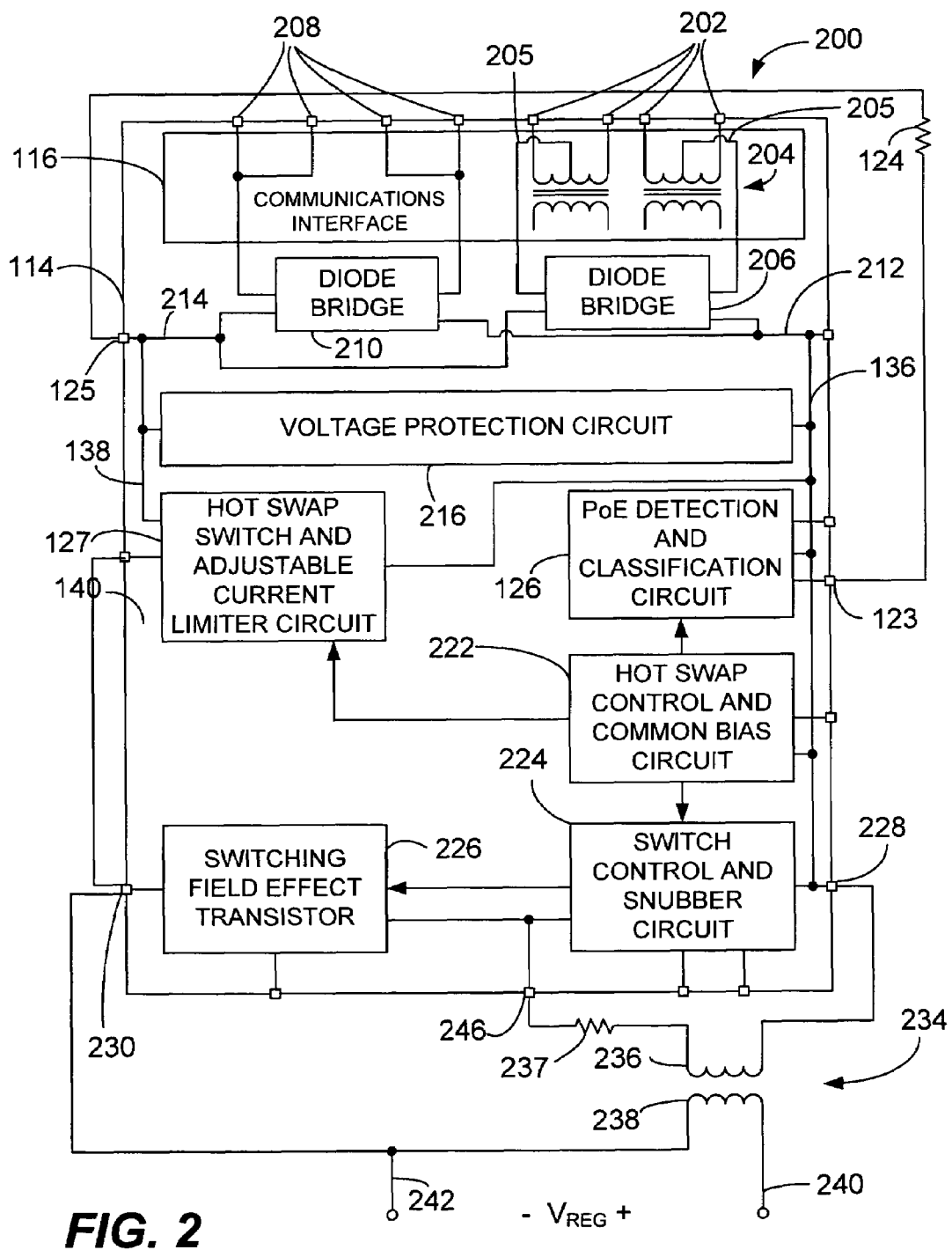
FIG. 2 is a block diagram of a particular illustrative embodiment of a powered device including a hot swap switch and adjustable current limiter circuit.

FIG. 2 is a block diagram of a particular illustrative embodiment of a powered device 200 including a hot swap switch and adjustable current limit circuit 127. The powered device 200 includes an integrated circuit 114 that is coupled to an external resistor 124 and to a DC-to-DC converter, such as the transformer 234.

The integrated circuit 114 includes pins 202 and 208, a communications interface 116, and diode bridges 206 and 210. The pins 202 and 208 may be coupled to wire pairs within a twisted pair Ethernet cable, such as the network cable 106 in FIG. 1. The pins 202 may be coupled to wire pairs that carry both data and power. The pins 202 are coupled to transformers 204 within the communications interface 116. The transformers 204 include center taps 205, which are coupled to the diode bridge 206 to provide a common mode power supply. The pins 208 may be coupled to spare wire pairs of the network cable to receive a power supply, which is provided by the communications interface 116 to the diode bridge 210. Typically, power is received either via the pins 202 or the pins 208. However, since it is not always known which of the pairs of wires will provide the power supply, two diode bridges 206 and 210 may be provided to account for either implementation. The diode bridges 206 and 210 rectify the received power supply and provide a rectified power supply voltage to positive voltage supply terminal 212 and to negative voltage supply terminal 214. The positive voltage supply terminal 212 is coupled to a voltage supply terminal 136, which is coupled to a pin 228. The negative voltage supply terminal 214 is coupled to a voltage supply terminal 138 and to a pin 125. It should be noted that certain Ethernet implementations may incorporate two sets of data transformers within communications interface 116, in which case both diode bridges 206 and 210 may be connected to transformer centertaps.

The integrated circuit 114 of the powered device 200 also includes a voltage protection circuit 216, the hot swap switch and adjustable current limiter circuit 127, the power over Ethernet (PoE) detection and classification circuit 126, a hot swap control and common bias circuit 222, a switch control and snubber circuit 224, a switching field effect transistor 226, a voltage supply terminal 140, and pins 228, 230, and 246. A primary winding 236 of the external transformer 234 may be coupled to the pin 228 and may be coupled to the pin 246 via the resistor 237. A secondary winding 238 may be inductively coupled to the primary winding 236. The secondary winding 238 may include a first terminal 240 and may include a second terminal 242 coupled to the pin 230. The first terminal 240 and the second terminal 242 provide a regulated power supply voltage ($V_{REG}$) to associated load circuitry (not shown).

Generally, the switch control and snubber circuit 224 monitors a voltage level on the voltage supply terminal 136 and selectively activates the switching field effect transistor 226 to couple the pin 246 to the voltage supply terminal 140 to draw current across the primary winding 236. The switch control and snubber circuit 224 also diverts energy from the pin 246 to the voltage protection circuit 216 in response to electrostatic discharge events and inductive voltage kick events.

In general, the hot swap switch and adjustable current limiter circuit 127 couples the voltage supply terminal 138 to the voltage supply terminal 140 to allow a port current (device current) to flow. The PoE detection and classification circuit 126 is coupled to the voltage supply terminal 136 to detect a PoE detection operation and to provide an appropriate response to power sourcing equipment (such as PSE 102 in FIG. 1) via a network cable. Additionally, the PoE detection and classification circuit 126 detects a classification voltage from the power sourcing equipment via the voltage supply terminal 136. The PoE detection and classification circuit 126 applies a known voltage to the pin 123 (a device classification pin) in response to the classification voltage. The external resistor 124 is coupled to the integrated circuit 114 by pins 123 and 125. The known voltage applied to the pin 123 by the PoE detection and classification circuit 126 generates a classification current across the external resistor 124, resulting in a classification current signature, which may be detected by the power sourcing equipment to determine a power classification of the powered device 200.

In operation, the hot swap control and common bias circuit 222 generates a reference current based on the classification signature (or classification current). The reference current is provided by the hot swap control and common bias circuit 222 to the hot swap switch and adjustable current limiter circuit 127 to throttle current flow from the voltage supply terminal 140 to the voltage supply terminal 138. In one particular embodiment, the hot swap switch and adjustable current limiter circuit 127 may include a transistor and logic to control current flow across the transistor according to the reference current.

Figure 3:
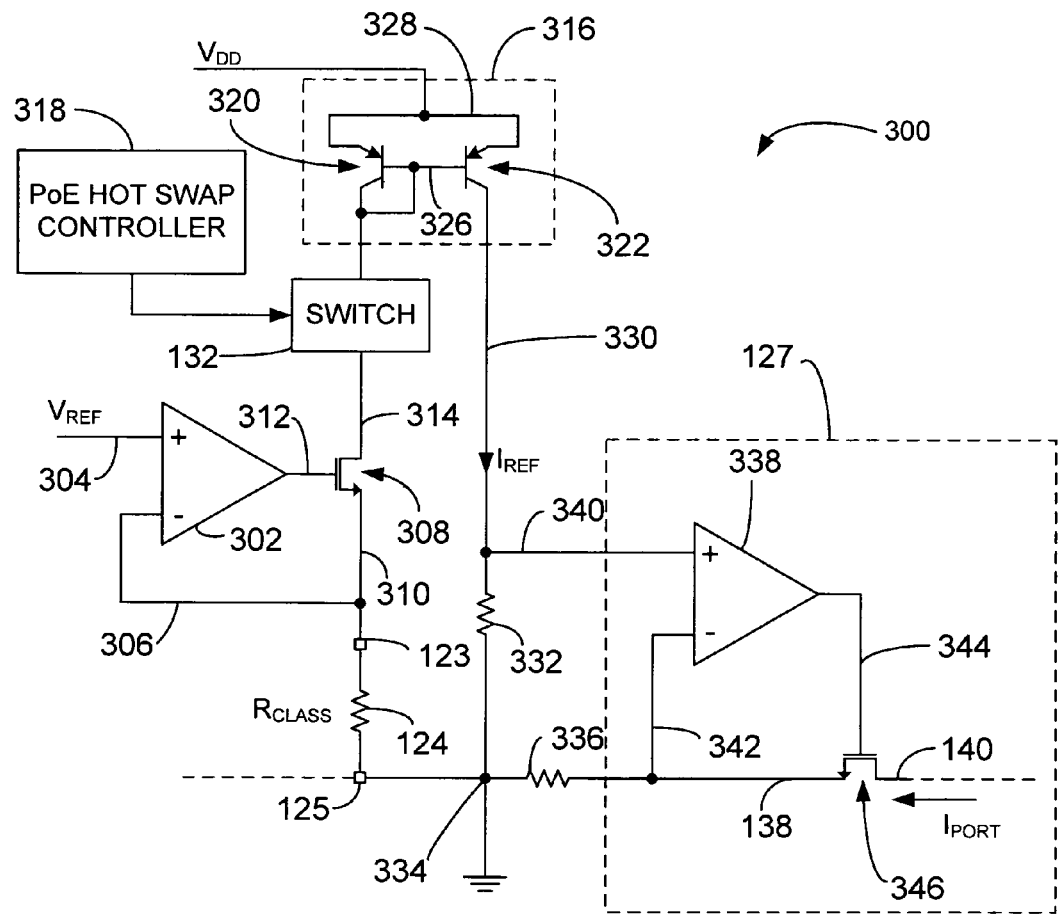
FIG. 3 is a partial block diagram and partial circuit diagram of a particular embodiment of an illustrative system for limiting a device current based on a power over Ethernet (PoE) classification signature which may be used in a powered device, such as the powered devices of FIGS. 1 and 2.

FIG. 3 is a partial block diagram and partial circuit diagram of a particular embodiment of an illustrative system 300 for limiting a device current based on a power over Ethernet (PoE) classification signature which may be used in a powered device, such as the powered devices of FIGS. 1 and 2. The system 300 includes an external resistor ($R_{CLASS}$) 124 coupled between pins 123 and 125 of an integrated circuit. The pin 123 may be referred to as a device classification pin, and pin 125 is a negative voltage supply pin. The system 300 includes differential amplifiers 302 and 338, a transistor 308, a switch 132, a current mirror 316, a power over Ethernet hot swap controller 318, a first resistor 336, a second resistor 332, and a hot swap transistor (switch) 346.

In general, the differential amplifier 302 includes a first input 304 responsive to a reference voltage ($V_{REF}$), a second input 306 coupled to the pin 123, and an output coupled to a control terminal 312 of the transistor 308. The transistor 308 includes a first terminal 310 coupled to the pin 123 and a second terminal 314 coupled to the switch 132. The switch 132 couples the second terminal 314 to the current mirror 316. The current mirror 316 includes a pair of transistors 320 and 322 having a common base 326 and a common emitter 328. The transistor 322 includes a collector terminal 330. In general, the collector terminal 330 conducts a reference current that mirrors a current across the external resistor 124.

The differential amplifier 338 includes a first input 340 coupled to the collector terminal 330 and to the second resistor 332. The second resistor 332 is coupled to the collector terminal 330 and to a node 334, which is coupled to the voltage supply terminal 138. The differential amplifier 338 includes a second input 342 that is coupled to the first resistor 336, which is coupled to the voltage supply terminal 138 and to the node 334. The differential amplifier 338 includes an output that is coupled to a control terminal 344 of the hot swap transistor 346, which controllably couples the voltage supply terminal 140 to the voltage supply terminal 138 to allow current flow between the voltage supply terminals 140 and 138.

In a particular illustrative embodiment, the current limiter circuit 127 may include the first resistor 336 that is responsive to a device current ($I_{PORT}$) from a hot swap transistor (switch) 346, the second resistor 332 that is responsive to the reference current ($I_{REF}$) from a reference current generator, such as the current mirror 316, and a comparator, such as the differential amplifier 338, including the first input 340 coupled to the second resistor 332, the second input 342 coupled to the first resistor 336, and the output coupled to a control terminal 344 of the hot swap transistor 346 to control the hot swap transistor 346 to limit the device current ($I_{PORT}$) such that a voltage drop across the first resistor 336 resulting from the device current ($I_{PORT}$) is less than or equal to a voltage drop across the second resistor 332 resulting from the reference current ($I_{REF}$). In a particular embodiment, the device current ($I_{PORT}$) may be adjusted by altering a ratio of resistances of the second resistor ($R_2$) 332 to the first resistor ($R_1$) 336, such that the ratio is $R_2/R_1$. In a particular embodiment, the resistance of the second resistor 332 is much larger than the resistance of the first resistor 336. For example, the second resistor 332 may have a resistance that is 1000 times larger than the resistance of the first resistor 336. In an alternative embodiment, the device current ($I_{PORT}$) may be adjusted by altering or adjusting the reference current ($I_{REF}$), such as by replacing the external resistor 124 with a resistor having a different resistance value. The reference current ($I_{REF}$) may be altered during a design process by altering design parameters of the transistors 320 and 322 to alter the reference current ($I_{REF}$) relative to a current across the external resistor 124. For example, a mismatched pair of transistors 320 and 322 may mirror the current across the external resistor 124 by a ratio other than a 1-to-1 ratio. Alternatively, by replacing the external resistor 124 with a resistor having a different resistance value, the reference current ($I_{REF}$) is changed. In yet another embodiment, the voltage reference at input 304 of the differential amplifier 302 may be adjusted, thereby altering the classification signature to change the reference current ($I_{REF}$).

In general, the reference current ($I_{REF}$), in conjunction with the second resistor 332, the first resistor 336, and the differential amplifier 338, operates to define a threshold. The differential amplifier 338 generates a differential output to the control terminal 344 of the hot swap transistor 346 to limit flow of the device current ($I_{PORT}$). The differential amplifier 338 throttles the device current ($I_{PORT}$) to limit the voltage drop across the first resistor 336 from the device current ($I_{PORT}$) to a level that is less than or equal to a voltage drop across the second resistor 332 resulting from the reference current ($I_{REF}$). Thus, differential amplifier 338 may limit the device current ($I_{PORT}$) such that the voltage drop across the first resistor 336 matches the voltage drop across the second resistor 332. It should be understood that adjusting the reference current ($I_{REF}$), altering the ratio of the resistance value ($R_2$) of the second resistor 332 relative to the resistance value ($R_1$) of the first resistor, or any combination thereof, operates to alter the device current ($I_{PORT}$). In particular, the device current ($I_{PORT}$) may be determined according to the following equation:

$$I_{PORT} \leq I_{REF} \frac{R_2}{R_1}. \quad \text{(Equation 2)}$$

Figure 4:
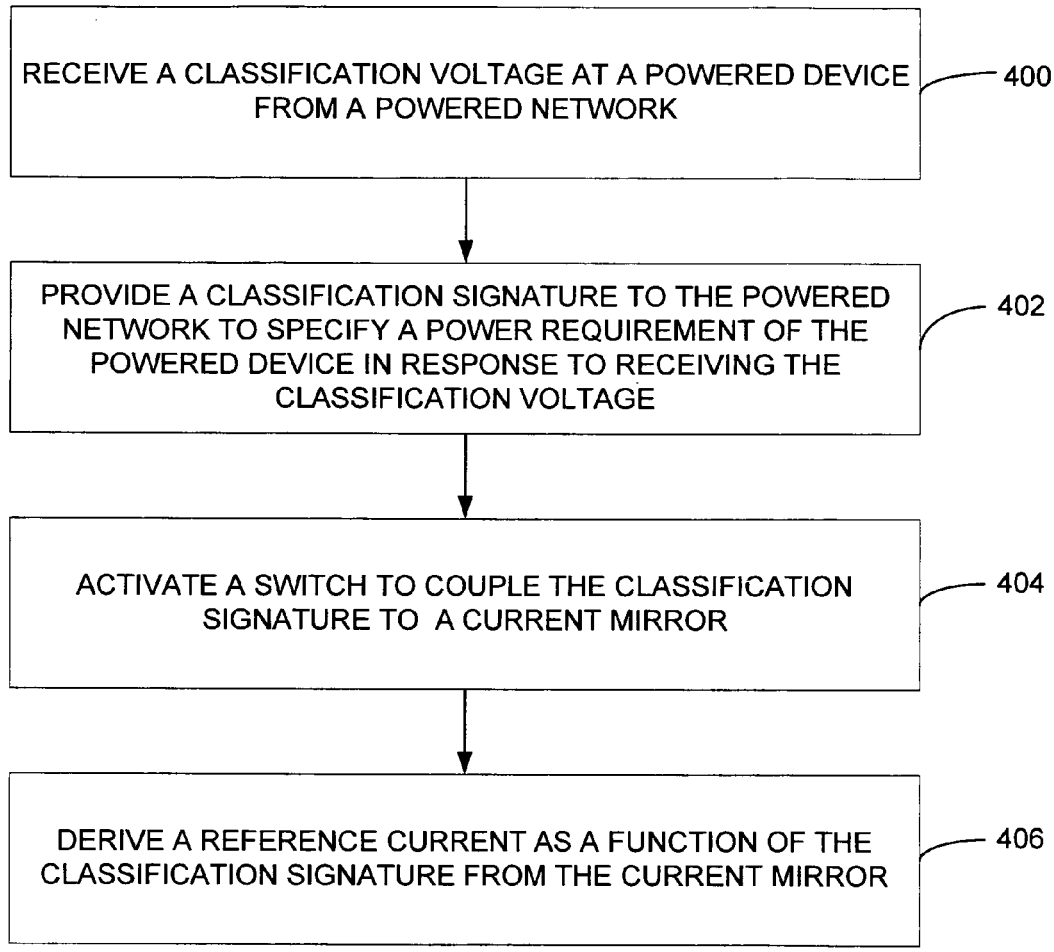
FIG. 4 is a flow diagram of a particular illustrative embodiment of a method of deriving a reference current from a power over Ethernet (PoE) classification signature which may be used in a powered device, such the powered devices of FIGS. 1-3.

FIG. 4 is a flow diagram of a particular illustrative embodiment of a method of deriving a reference current from a power over Ethernet (PoE) classification signature which may be used in a powered device, such the powered devices of FIGS. 1-3. A classification voltage is received at a powered device from a powered network (block 400). A classification signature is provided to the powered network to specify a power requirement of the powered device in response to receiving the classification voltage (block 402). A switch is activated to couple the classification signature to a current mirror (block 404). A reference current is derived as a function of the classification signature from the current mirror (block 406).

Figure 5:
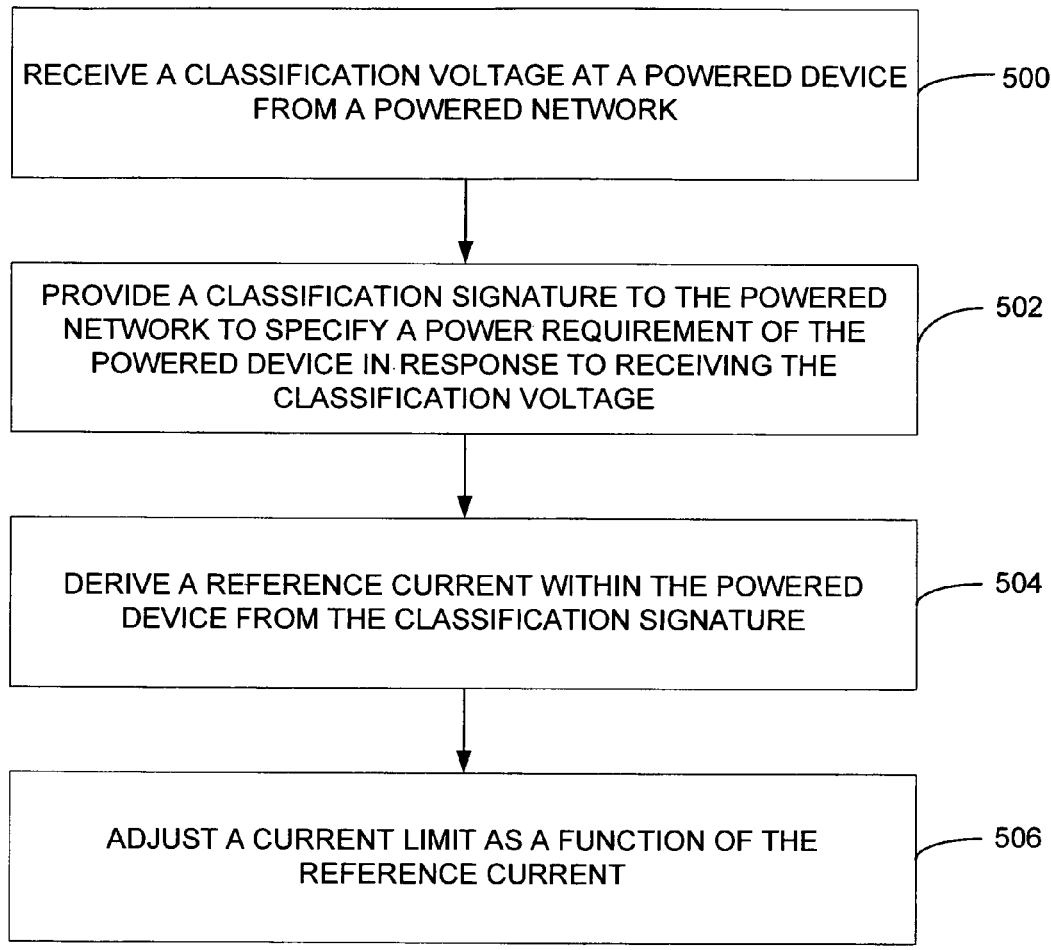
FIG. 5 is a flow chart of an embodiment of a method of limiting a current of a powered device based on a reference current.

FIG. 5 is a flow chart of an embodiment of a method of limiting a current of a powered device based on a reference current. A classification voltage is received at a powered device from a powered network (block 500). A classification signature is provided to the powered network to specify a power requirement of the powered device in response to receiving the classification voltage (block 502). A reference current within the powered device is derived from the classification signature (block 504). A current limit is adjusted as a function of the reference current (block 506).

In one particular embodiment, the classification signature includes a current provided to an external resistor. In another embodiment, the reference current is derived by mirroring the classification current via a current mirror. In yet another embodiment, the current limit is adjusted by receiving a first voltage related to the reference current at a first input of a comparator, receiving a second voltage related to a device current at a second input of the comparator, and generating a comparator output to a control terminal of a transistor to limit the device current such that the first voltage is greater than the second voltage. In yet another particular embodiment, before the reference current is derived, a switch may be activated to couple a reference current generator to a power over Ethernet detection and classification circuit and the reference current may be generated from the classification signature using the reference current generator.

Although the present specification describes components and functions that may be implemented in particular embodiments with reference to particular standards and protocols, the invention is not limited to such standards and protocols. For example, the PoE standard represents an example of the state of the art. Such standards are periodically superseded by faster or more efficient alternatives having essentially the same functions. Accordingly, replacement standards and protocols having the same or similar functions as those disclosed herein are considered equivalents thereof.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a classification voltage at a powered device from a powered network;
   providing a classification signature to the powered network in response to receiving the classification voltage to specify a power requirement of the powered device;
   deriving a reference current within the powered device from the classification signature; and
   adjusting a current limit as a function of the reference current.

2. The method of claim 1, wherein the classification signature comprises a current provided to an external resistor.

3. The method of claim 1, wherein deriving the reference current comprises mirroring the classification signature via a current mirror.

4. The method of claim 1, wherein adjusting the current limit comprises:
   receiving a first voltage related to the reference current at a first input of a comparator;
   receiving a second voltage related to a device current at a second input of the comparator; and
   generating a comparator output to a control terminal of a transistor to limit the device current such that the first voltage is greater than the second voltage.

5. The method of claim 1, wherein, before deriving the reference current, the method further comprises:
   activating a switch to couple a reference current generator to a power over Ethernet detection and classification circuit; and
   generating the reference current from the classification signature using the reference current generator.

6. The method of claim 1, wherein providing the classification signature comprises applying a known reference voltage to an external resistor to produce a classification current and wherein the reference current is derived from the classification current.

7. The method of claim 6, further comprising:
   replacing the external resistor with an external resistor having a different resistance value to provide a different classification signature and to alter the reference current.

8. A powered device comprising:
   an interface responsive to a powered network;
   a power over Ethernet (PoE) detection and classification circuit to detect a device classification voltage from the interface and to provide a classification signature in response to the classification voltage;
   a reference current generator responsive to the classification signature to generate a reference current related to the classification signature; and
   a current limiter circuit responsive to the reference current to adjust a device current limit.

9. The powered device of claim 8, further comprising:
   a hot swap switch to selectively couple a voltage supply terminal to a switched supply terminal to conduct a device current, the hot swap switch responsive to the current limiter circuit to adjust the device current to a level that is below the device current limit.

10. The powered device of claim 8, wherein the reference current generator comprises a current mirror to mirror a current associated with the classification signature to produce the reference current.

11. The powered device of claim 8, wherein the classification signature is defined by an external resistor that determines a power classification of the powered device.

12. The powered device of claim 11, wherein the device current limit is dependent on the power classification.

13. The powered device of claim 8, wherein the current limiter circuit comprises:
   a first resistor responsive to a device current from a hot swap switch;
   a second resistor responsive to the reference current; and
   a comparator including a first input coupled to the second resistor, a second input coupled to the first resistor, and an output coupled to a control terminal of the hot swap switch, the comparator to control the hot swap switch to limit the device current such that a voltage drop across the first resistor is less than or equal to a voltage drop across the second resistor.

14. The powered device of claim 13, wherein the device current is adjusted by altering a ratio of the second resistor to the first resistor.

15. The powered device of claim 13, wherein the device current is adjusted by adjusting the reference current.

16. A powered device comprising:
   a device classification pin responsive to an external resistance;
   a classification circuit to apply a reference voltage to the device classification pin to produce a power over Ethernet (PoE) classification signature;
   a reference current generator to derive a reference current from the PoE classification signature; and
   a current limiter circuit to limit a device current to a threshold defined by the reference current.

17. The powered device of claim 16, wherein the current limiter circuit comprises:
   a transistor including a first terminal coupled to a first voltage supply terminal, a second terminal, and a control terminal;
   a first resistor coupled to the second terminal and to a second voltage supply terminal;
   a second resistor responsive to the reference current and coupled to the second voltage supply terminal; and
   a differential amplifier including a first input coupled to the second resistor, a second input coupled to the second terminal of the transistor, and an output coupled to the control terminal, the differential amplifier to limit current flow across the first resistor such that the voltage drop across the first resistor from the device current matches a voltage drop across the second resistor from the reference current.

18. The powered device of claim 16, wherein the reference current generator comprises a current mirror to mirror a classification current across the external resistance.

19. The powered device of claim 18, wherein the external resistance determines the reference current.

20. The powered device of claim 16, wherein the current limiter circuit includes a first resistor having a first resistance and a second resistor having a second resistance, and wherein the device current is limited by the reference current according to a ratio of the second resistance to the first resistance.

* * * * *